United States Patent Office 3,422,134
Patented Jan. 14, 1969

3,422,134
STEROIDS
Gerald W. Krakower, Elizabeth, Josef Fried, Princeton, and David Walter Rosenthal, New Brunswick, N.J., assignors, by mesne assignments, to E. R. Squibb & Sons, Inc., New York, N.Y., a corporation of Delaware
No Drawing. Filed Sept. 13, 1963, Ser. No. 308,627
U.S. Cl. 260—468          10 Claims
Int. Cl. C07c *69/74;* C07c *61/00;* C07c *169/60*

This invention relates to and has for its objects the provision of new physiological active steroids, tetra- and pentacyclic triterpenes and derivatives thereof, processes for their production and new intermediates useful in said preparation.

The novel compounds of this invention may be characterized as steroids or tetracyclic or pentacyclic triterpenes or derivatives thereof, possessing an A-ring structure represented by the following Formula I:

I

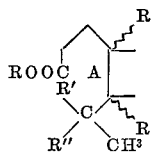

wherein each R is selected from the group consisting of hydrogen and lower alkyl (e.g. methyl); R' represents hydroxy; R" represents lower alkyl (e.g. methyl) or hydrogen; and together R' and R" is selected from the group consisting of lower alkylene (e.g. methylene) and oxo (O=).

In the most preferable embodiment of this invention the compounds of this invention are those polycyclic compounds which may be substituted or unsubstituted in various positions, possessing the A-ring structure of Formula I and are further characterized by being selected from the group consisting of methylcholestanes, lanostanes, dammaranes, eburicanes, euphanes, tirucallanes, cycloartenanes, cycloaudenanes, oleananes, ursanes, lupanes, taraxastanes, taraxenes, friedelanes, alnusemanes, and other like compounds.

The compounds of this invention have been found to possess antibiotic activity and may be employed for this purpose against a variety of pathogenic microorganisms. Among the organisms against which these compounds may be employed are included *Staphylococcus aureus* and *Mycobacterium tuberculosis.* The compounds of this invention may be administered for the purposes of this invention topically, parenterally or perorally. Thus, they may be administered by themselves, or in a pharmaceutical composition suitable for such purposes, for example, in an admixture of the compound and a suitable pharmaceutical carrier. Thus, the novel compounds of this invention may be administered in an ointment, cream, injectible suspension, tablet or capsule form, the concentration of the compound depending in each case on the relative potency of the particular compound and the requirements of the patient.

The novel compounds of this invention may be prepared by the processes of this invention, employing as starting materials the saturated steroids having an A-ring structure represented by the following Formula II:

II

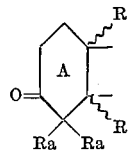

wherein R is as hereinbefore defined, and each Ra is selected from the group consisting of hydrogen and lower alkyl, at least one Ra being lower alkyl.

The starting materials which may be employed in the practice of this invention include such saturated polycyclic compounds as the methylcholestanes (e.g. 4α-methyl-3-cholestanone, 4,4-dimethyl-3-cholestanone); the lanostanes (e.g. lanostene-3-one); the dammaranes (e.g. 24, 25-dihydrodipterocarpol); the eburicanes (e.g. methyl eburicane-3β-ol-11-one-21-oate); the euphanes (e.g. euphane-3β-ol-11-one acetate); the tirucallanes (e.g. 8,9-oxidotirucallane-3β-ol acetate); the cycloartenones (e.g. cycloartenone); the oleananes (e.g. oleanane-3-one); the ursanes (e.g. α-amyrine oxide)– the lupanes (e.g. lupane-3-one)– the taraxastanes (e.g. dihydrotaraxasterol); the taraxanes (e.g. dihydrotaraxerone); the friedelanes (e.g. friedeline); the alnusenanes (e.g. anusonyl acetate); and other like compounds.

The eburicane starting materials may be prepared in accordance with the teachings set forth in copending application Ser. No. 198,425, filed May 29, 1962, in the names of Joseph Fried and Gerald Krakower, now Patent No. 3,169,957, granted Feb. 16, 1965.

(In the specification and in the appended claims, whenever in the formulae set forth herein a curved line (∫) is employed in the linkage of atoms, it is meant to denote that the connected atom may be either in the alpha or beta position, as is determined in the respective compounds involved.)

The process by which the compounds of this invention may be prepared may be represented by the following equations, wherein R, R' and Ra are as hereinbefore defined, and Z is lower alkylene and oxo (O=).

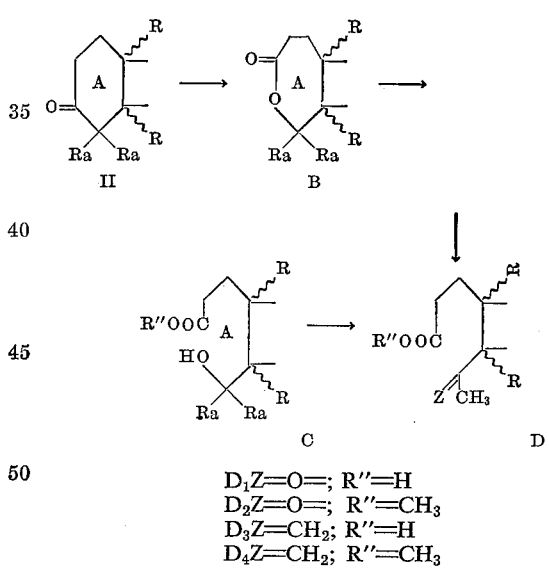

$D_1 Z=O=; R''=H$
$D_2 Z=O=; R''=CH_3$
$D_3 Z=CH_2; R''=H$
$D_4 Z=CH_2; R''=CH_3$

It is to be noted as stated hereinabove, that the starting materials employable in the practice of this invention must be saturated polycyclic compounds possessing an A-ring structure conforming to Formula II. In addition, these compounds may be substituted or unsubstituted in other positions of the molecule. It should also be remembered that the starting materials of this invention may also be prepared from the 3-hydroxy or 3-acyloxy substituted derivatives of those set forth hereinabove. In that case, the 3-acyloxy compounds may first be hydrolyzed, by any method known to the art, for the 3-hydroxy compounds, and the 3-hydroxy compounds may then be oxidized, by the procedures well known in the art, to yield the 3-keto starting materials possessing an A-ring structure conforming to that set forth in Formula II.

In the first step of the process of this invention the starting materials (Compounds II) are treated with a peracid, for example, m-chloroperbenzoic acid, to yield the 4-oxa-A-homo compounds (Compounds B) which are new compounds of this invention.

The 4-oxa-A-homo compounds (Compounds B) are then hydrolyzed as by treatment with an alcoholic alkali metal base, e.g. methanolic potassium hydroxide, to yield the 3,4-seco-4-hydroxy-3-oic acid compounds (Compounds C), which are new final products of this invention.

Compounds B may also be pyrolytically cleaved to directly yield the 3,4-seco-4-methyl compounds (Compounds D, wherein Z=CH$_2$) which are also new final products of this invention.

Alternatively, Compounds C (wherein one R$a$=H) may also be treated with an oxidizing agent, for example, chromic acid, to yield the 3,4-seco-4-keto-3-oic acid compounds (Compounds D, wherein Z=O=), which are also new compounds of this invention. These new Compounds D (wherein Z=O=) may also be obtained by treating compounds D (wherein Z=CH$_2$) with ozone.

The invention may be further illustrated by the following examples (all temperatures being in degrees centigrade).

EXAMPLE 1

4-oxa-4a,4a-dimethyl-A-homocholestane-3-one

A solution of 414 mg. of 4,4-dimethyl-3-cholestanone (1 mole) and 345 mg. of m-chloroperbenzoic acid (2 moles) in 10 ml. of benzene-choloform (3:1) is kept at 32° for 30 hours. The solution is diluted with chloroform, washed with 5% potassium iodide solution, 5% sodium bisulfite solution, water, 5% sodium bicarbonate solution and water, dried and evaporated to give 415 mg. of crude material. Two recrystallizations from methanol gives 146 mg. of analytically pure 4-oxa-4a,4a-dimethyl-A-homocholestane-3-one, M.P. 123–124°; [α]$_D^{20}$ −1.7°;

$\lambda_{max.}^{KBr}$ 5.79, 5.85$\mu$ (sh)

*Analysis.*—Calc'd for C$_{29}$H$_{50}$O$_2$: C, 80.87; H, 11.70. Found: C, 80.91; H, 11.71.

EXAMPLE 2

3,4-seco-4,4-dimethylcholestane-4-ol-3-oic acid

A solution of 100 mg. of the 4-oxa-4a,4a-dimethyl-A-homocholestane-3-one in 10 ml. of 5% methanolic potassium hydroxide is kept at room temperature for four and one-half hours. The pH is adjusted to 4.5 and after dilution with water the methanol is evaporated. The aqueous suspension is extracted with chloroform and the chloroform washed with water, dried, and evaporated to give 99 mg. of the crude acid. Recrystallization from methanol gives 68 mg. of 3,4-seco-4,4-dimethylcholestane-4-ol-3-oic acid (IIIa), M.P. 137–139.5°. The analytical sample has M.P. 137.5–139°; [α]$_D^{25}$ +27°;

$\lambda_{max.}^{Nujol}$ 2.93, 3.04, 5.81 (sh), 5.84$\mu$

*Analysis.*—Calc'd for C$_{29}$H$_{52}$O$_3$: C, 77.62; H, 11.68. Found: C, 77.88; H, 11.83.

EXAMPLE 3

4α-methylcholestanone

4α-methylcholestanone is prepared by the reduction of 4α-methylcholestenone with lithium in liquid ammonia according to the procedure of Mazur and Sondheimer (J. Am. Chem. Soc., 80, 5228 [1958]). The product from a 200 mg. run shows a strong hydroxyl group in the infrared and is reoxidized with Jones reagent and chromatographed. The pure product melts at 121–122° (block).

EXAMPLE 4

4-oxa-4aα-methyl-A-homocholestane-3-one

A solution of 75 mg. of 4α-methylcholestanone, obtained in Example 3, and 75 mg. of m-chloroperbenzoic acid in 1.0 ml. of chloroform is allowed to remain at room temperature overnight. The product is then treated according to the procedures set forth in Example 1 and the product crystallized from methanol. The yield of crystalline 4-oxa-4α-α-methyl-A-homocholestane-3-one is 65 mg. M.P. 191–191.5°; [α]$_D^{25}$ −6° (c., 0.66 in CHCl$_3$);

$\lambda_{max.}^{Nujol}$ 5.75, 7.93 $\mu$

The mother liquors are analyzed by vapor phase chromotography and shown to be at least 65% pure. Isolated yield, 82%. Yield calculated on the basis of product present in the mother liquor, 93%.

*Analysis.*—Calc'd for C$_{28}$H$_{48}$O$_2$·CH$_3$OH: C, 77.62; H, 11.68. Found: C, 77.72; H, 11.18.

EXAMPLE 5

3,4-seco-(4S)-4-methyl-4-hydroxy-3-cholestanoic acid

Thirty mg. of 4-oxa-4aα-methyl-A-homocholestan-3-one is suspended in 10 ml. of 1.2 N potassium hydroxide in 98% methanol and shaken at room temperature overnight. The clear solution is then acidified carefully with dilute hydrochloric acid to pH 3.5 and extracted thoroughly with chloroform. The chloroform extract is washed with saturated sodium chloride solution and dried over sodium sulfate. Evaporation gives a white gel which weighs 30 mg. Seven mg. of this product crystallizes poorly to yield 5 mg. of poorly formed crystals from ether-hexane. The crystals are washed further with hexane and dried to give 3,4-seco - (4S) - 4-methyl-4-hydroxy-3-cholestanoic acid, M.P. 110–115°;

$\lambda_{max.}^{KBr}$ 297, 585$\mu$

*Analysis.*—Calc'd for C$_{28}$H$_{50}$O$_3$: C, 77.36; H, 11.59; neutralization equivalent, 434. Found: C, 77.51; H, 11.53; neutralization equivalent, 439.

EXAMPLE 6

3,4-seco-(4S)-methyl-4-hydroxy-3-cholestanoic acid 4-oxa-4aα-methyl-A-homocholestane-3-one (46 mg.) derived from 4α-methylcholestanone is hydrolyzed with 20 ml. of 1.5 N KOH in methanol at room temperature for 16 hours. The hydroxy acid obtained by acidification and extraction with chloroform is then methylated with diazomethane in ethermethanol to furnish the crystalline methyl 3,4-seco-(4S)-4-hydroxy-4-methyl-3-cholestanoate (49 mg.). This substance is shown to be completely homogeneous by thin layer chromatography. After crystallization from methanol 37 mg. of M.P. 103–104° is isolated, [α]$_D^{25}$ +14° (c., 0.70 in CHCl$_3$);

$\lambda_{max.}^{Nujol}$ 3.05, 5.75, 8.52$\mu$

*Analysis.*—Calc'd for C$_{29}$H$_{52}$O$_3$: C, 77.62; H, 11.68. Found: C, 77.54; H, 11.67.

The ester thus obtained is then saponified as described in Example 5 and the pure 3,4-seco-(4S)-4-methyl-4-hydroxy-3-cholestanoic acid isolated by extraction with chloroform.

EXAMPLE 7

Methyl 3,4-seco-4-oxo-4-methyl-3-cholestanoate

Methyl 3,4-seco-(4S)-4-hydroxy-4-methyl-3-cholestanoate (27.5 mg.) is dissolved in acetone (20 ml.) and oxidized with chromic acid and sulfuric acid in acetone. After decomposition of the excess oxidant with methanol, the product is taken up in chloroform and water, extracted with more chloroform and the chloroform extract extracted with saturated sodium chloride solution and evaporated to give 22 mg. of an oil which crystallizes on standing. Recrystallization from methanol gives methyl 3,4-seco-4-oxo-4-methyl-3-cholestanoate possessing the following properties: M.P. 74–75°; [α]$_D^{25}$ −5° (c., 1.51 in CHCl$_3$);

$\lambda_{max.}^{Nujol}$ 5.74, 5.85, 8.32$\mu$

*Analysis.*—Calc'd for C$_{29}$H$_{50}$O$_3$: C, 77.97; H, 11.28. Found: C, 77.97; H, 11.33.

EXAMPLE 8

3,4-seco-4-keto-4-methyl-3-cholestanoic acid

A suspension of 100 mg. of methyl 3,4-seco-4-keto-4-methyl-3-cholestanoate in 35 ml. of 1.5 N potassium hydroxide in 98% methanol is stirred at room temperature overnight. Following the procedure set forth in example 5 gives 61 mg. of pure 3,4-seco-4-keto-4-methyl-3-cholestanoic acid, which after recrystallization from methanol has the following properties: M.P. 118–119°; $[\alpha]_D^{25}$ +4° (c, 0.74 in $CHCl_3$);

$$\lambda_{max.}^{Nujol} \ 3.70 \ (broad), \ 6.88\mu$$

*Analysis.*—Calc'd for $C_{28}H_{48}O_3$: C, 77.62; H, 11.07. Found: C, 77.72; H, 11.18.

EXAMPLE 9

4-oxa-4aβ-methyl-A-homocholestane-3-one

A solution of 30 mg. of 4β-methylcholestanone and 41 mg. of m-chloroperbenzoic acid in 0.4 ml. of chloroform is maintained at 32° for sixteen hours. The mixture is then poured into water and benzene and the benzene solution shaken successively with solutions of potassium iodide, sodium bisulfite and finally sodium bicarbonate and sodium chloride. The combined benzene extracts are dried over sodium sulfate, filtered and evaporated to dryness in vacuo. Crystallization of the residue from methanol-ether gives two crops: (1) 20 mg., M.P. 177–179°; (2) 6 mg. M.P. 171–173°, $[\alpha]_D^{23}$ 0° ±1.6°;

$$\lambda_{max.}^{KBr} \ 5.78, \ 8.45\mu$$

*Analysis.*—Calc'd for $C_{28}H_{48}O_2$: C, 80.71; H, 11.61. Found: C, 80.69; H, 11.58.

EXAMPLE 10

3,4-seco-(4R)-4-methyl-4-hydroxy-3-cholestanoic acid

Fifty mg. of 4-oxa-4aβ-methyl-A-homocholestan-3-one is hydrolyzed with 20 ml. of potassium hydroxide in methanol and treated according to the procedures set forth in Example 5. The resulting acid is recrystallized from methanol.

Its methyl ester is prepared with diazomethane and recrystallized from methanol, according to the procedures set forth in Example 6.

EXAMPLE 11

Methyl 3,4-seco-4-methyl-4-methylenecholestan-3-oate

Fifty mg. of 4-oxa-4a-4a-dimethyl-A-homocholestane-3-one is placed into a small tube which is then evacuated and sealed under high vacuum. The contents of the tube is heated rapidly in a Wood's metal bath to 200° and maintained at 200–210° for ten minutes. The tube is then cooled, opened and the material on the bottom of the tube (45 mg.) (5 mg. of starting material had sublimed) dissolved in 10 ml. of ether containing a drop of methanol. This solution is treated with excess ethereal diazomethane and evaporated. Crystallization from methanol gives 22 mg. of fine crystals, M.P. 64–65°. From the mother liquor an additional 7 mg. of methyl 3,4-seco-4-methyl-4-methylenecholestan-3-oate (M.P. 67–68°) is recovered by chromatography on alumina. Recrystallization of the first crop raises the M.P. to 67–68.5°; $[\alpha]_D^{24}$ +13.5° (c, 0.75 in $CHCl_3$);

$$\lambda_{max.}^{nujol} \ 5.71, \ 6.10, \ 11.17\mu$$

*Analysis.*—Calc'd for $C_{30}H_{52}O_2$: C, 81.02; H, 11.79. Found: C, 80.92; H, 11.61.

EXAMPLE 12

3,4-seco-4-methyl-4-methylene-3-cholestanoic acid

Seventy-one mg. of 4-oxa-4a,4a-dimethyl-A-homo-3-cholestanone is pyrolyzed in a sealed tube as described in Example 11. Recrystallization of the reaction mixture from methanol furnished 28 mg. of the crystalline 3,4-seco-4-methyl-4-methylene-3-cholestanoic acid possessing the following properties: M.P. 106–108°; $[\alpha]_D^{23}$ +15° (c., 0.99 in $CHCl_3$);

$$\lambda_{max.}^{CHCl_3} \ 5.86, \ 5.10, \ 8.31, \ 11.10\mu$$

*Analysis.*—Calc'd for $C_{29}H_{50}O_2$: C, 80.87; H, 11.70. Found: C, 80.81; H, 11.75.

EXAMPLE 13

Methyl eburicane-3,11-dione-21-oate

A solution of 778 mg. of methyl eburicane-3β-ol-11-one-21-oate in 55 ml. of acetone is treated with a 10% excess of chromic acid and sulfuric acid reagent at room temperature. The excess chromic acid is decomposed with methanol and the reaction mixture diluted with 100 ml. of water and 50 ml. of chloroform and the organic solvents evaporated in vacuo. The aqueous suspension is extracted with chloroform and the chloroform solution washed with water, dried and evaporated to give 784 mg. of crude product. This is adsorbed on a column of 25 g. of neutral alumina and eluted with benzene and benzene chloroform (9:1) to give 734 mg. of methyl eburicane-3,11-dione-21-oate, which on recrystallization from methanol gives a first crop of 443 mg., M.P. 139–140°, and a second crop of 152 mg., M.P. 137–139°. The analytical sample had M.P. 143–144°; $[\alpha]_D^{25}$ +41.8 ($CHCL_3$)

$$\lambda_{max.}^{Nujol} \ 5.77, \ 5.87\mu$$

*Analysis.*—Calc'd for $C_{32}H_{52}O_4$: C, 76.75; H, 10.47. Found: C, 76.77; H, 10.43.

EXAMPLE 14

3,4-secoeburicane-4-ol-11-one-3,21-dioic acid 21-methyl ester 3→4-lactone

A solution of 242 mg. of methyl eburicane-3,11-dione-21-oate (0.5 mole) and 345 mg. of m-chloroperbenboic acid (2 moles) in 5 ml. of methylenedichloride is kept at room temperature for 43 hours. The reaction mixture is diluted with chloroform and washed successively with 5% potassium iodide solution, 5% sodium sulfite solution, water, 5% potassium bicarbonate solution and water, dried and evaporated to give 246 mg. of product. Two recrystallizations from methanol give 134 mg. of the lactone of 3,4 - secoeburicane - 4 - ol - 11 - one- - 3,21 - dioic acid 21-methyl ester, M.P. 167–170°; $[\alpha]_D$ +70.2°;

$$\lambda_{max.}^{KBr} \ 5.78, \ 5.86\mu$$

*Analysis.*—Calc'd for $C_{32}H_{52}O_7$: C, 74.37; H, 10.14. Found: C, 74.50; H, 10.32.

EXAMPLE 15

3,4-secoeburicane-4-ol-11-one-3,21-dioic acid 21-methyl ester

A solution of 100 mg. of the lactone prepared in Example 14 in 10 ml. of 5% methanolic potassium hydroxide is kept at room temperature for six hours. The pH is adjusted to 4.5 and the reaction mixture diluted with water. The methanol is evaporated, the aqueous suspension extracted with chloroform and the chloroform solution washed with water, dried and evaporated.

The crude material is chromatographed on silica gel and the chloroform and chloroform-acetone (1:1) elutes combined and evaporated to give 39 mg. of the desired 3,4 - secoeburicane - 4 - ol - 11 - one - 3,21 - dioic acid 21-methyl ester. Neutralization equivalent: Calc'd, 535. Found, 505.

EXAMPLE 16

3,4-secodammarane-4,20ξ-diol-3-oic acid

A solution of 191 mg. of 24,25-dihydrodipterocarpol (0.43 mole, M.P. 97–98°) and 590 mg. of m-chloroperbenzoic acid (3.45 moles) in 5 ml. of chloroform is kept at room temperature for 23 hours. After dilution with 10 ml. of chloroform, the solution is washed with 5% potassium iodide solution, 5% sodium thiosulfate solution, water, 5% potassium bicarbonate solution and water, dried over sodium sulfate and evaporated to dryness in vacuo. Purification by thin layer chromatography on morin-impregnated alumina (Activity V) in a hexane-chloroform (1:4) system and elution of the area $R_f=0.40$–$0.60$ gives 131 mg. of crude lactone.

The total crude lactone is hydrolyzed with 20 ml. of 5% ethanolic potassium hydroxide at room temperature for six and one-half hours. After adjusting the pH to 4.5, the solution is diluated with water and the ethanol evaporated. The aqueous suspension is extracted with chloroform and the chloroform solution washed with water, dried and evaporated. Recrystallization of the crude product from methanol gives 85 mg. of 3,4-secodammarane - 4,20ξ-diol - 3 - oic acid, M.P. 175.5–176°; $[\alpha]_D^{20}$ +39.5° (CHCl$_3$);

$$\lambda_{max.}^{KBr} 2.93, 585\mu$$

*Analysis.*—Calc'd for $C_{30}H_{54}O_4$: C, 75.26; H, 11.37. Found: C, 75.19; H, 11.26.

EXAMPLE 17

3,4-seco-25,26,27-trisnordammarane-4,20ξ-diol-3,24-dioic acid 3→4,24→20 dilactone Following the procedure described in Example 16 for dihydrodipterocarpol but using 200 mg. of 25,26,27-trisnordammarane-3-one-20ξ-ol-24-oic acid lactone, there is obtained 3,4 - seco - 25,26,27 - trisnordammarane - 4, 20ξ-diol-3,24-dioic acid 3→4,24→20-dilactone, which after recrystallization from methanol has the following properties: M.P. 178–180° and 192–194° (polymorphic modifications); $[\alpha]_D^{23}$+104° (c. 0.75 in CHCl$_3$);

$$\lambda_{max.}^{KBr} 5.65, 580\mu$$

*Analysis.*—Calc'd for $C_{27}H_{42}O_4$ (430.61); C, 75.31; H, 9.83. Found: C, 75.33; H, 9.78.

EXAMPLE 18

3,4-seco-25,26,27-trisnordammarane-4,20ξ-diol-3,24-dioic acid

A solution of 40 mg. of the dilactone prepared in Example 17, in 8 ml. of 6% KOH in methanol is allowed to stand at room temperature overnight. Water is then added, the mixture acidified to pH 3.0 and extracted with methyl isobutyl ketone. The organic phase is washed with water, dried over sodium sulfate and the solvent evaporated to dryness. The residue (48 mg.) on crystallization from methanol-ethyl acetate furnishes 14 mg. of the 3,4-seco - 25,26,27 - trisnordammarane - 4,20ξ - diol - 3,24-dioic acid, M.P. 195–197° with sintering at 158°;

$$\lambda_{max.}^{KBr} 287, 5.85\mu$$

Neutralization equivalent: 235. calc'd 233.

The mother liquor from the above crystallization is recrystallized from acetone-hexane and furnishes 25 mg. of the 24→20-monolactone of 3,4-seco-25,26,27-trisnerdammarane-4,20ξ-diol-3,24-dioic acid, with the following properties: M.P. 205–207°; $[\alpha]_D^{23}$ +61° (c., 0.64 in CHCl$_3$);

$$\lambda_{max.}^{KBr} 2.92, 5.70, 5.76\mu$$

*Analysis.*—Calc'd for $C_{27}H_{44}O_5$ (448.62): C, 72.28; H, 9.89. Found: C, 72.21; H, 9.84.

EXAMPLE 19

3,4-seco-25,26,27-trisnor-$\Delta^{4(30)}$-dammarene-20ξ-ol 3,24-dioic acid 24→20-lactone Twenty-five mg. of 3,4 - seco - 25,26,27 - trisnor-dammarene-4,20ξ-diol-3,24-dioic acid, 3→4, 24→20-dilactone is placed into a small tube, which is then evacuated and sealed. The tube is immersed in a Woods' metal bath and maintained at 200–210° for ten minutes. The total product is crystallized slowly from methanol to yield fine needles, M.P. 153–154°; $[\alpha]_D^{23}$ +44.5° (c., 0.83 in CHCl$_3$);

$$\lambda_{max.}^{Nujol} 2.86, 5.69, 5.86, 11.22\mu$$

Yield—12 mg. of 3,4-seco-25,26,27-trisnor-$\Delta^{4(30)}$-dammarene-20ξ-ol-3,24-dioic acid 24→20 lactone.

*Analysis.*—Calc'd for $C_{27}H_{42}O_4 \cdot H_2O$ (448.63): C, 72.28; H, 9.89. Found: C, 72.43; H, 9.98.

EXAMPLE 20

3,4-secolupane-4-ol-3-oic acid 3→4-lactone

A solution of 0.426 g. of lupane-3-one (1 mmole) and 1.382 g. of m-chloroperbenzoic acid (8 mmoles) in 10 ml. of chloroform is kept at room temperature for 23 hours. After dilution with chloroform, the solution is washed with 5% potassium iodide solution, 5% sodium thiosulfate solution, water, 5% potassium bicarbonate solution and water, dried and evaporated. Two recrystallizations from acetone give 166 mg. of the lactone of 3,4-secolupane-4-ol-3-oic acid, M.P. 192–195°. The analytical sample has M.P. 193–196°; $[\alpha]_D^{20}$ + 34.8°;

$$\lambda_{max.}^{Nujol} 5.79\mu$$

*Analysis.*—Calc'd for $C_{30}H_{50}O_2$: C, 81.39; H, 11.38. Found: C, 81.40; H, 11.38.

EXAMPLE 21

3,4-secolupane-4-ol-3-oic acid

The lactone prepared according to the procedures of Example 20, (102 mg.) is dissolved in 30 ml. of 5% ethanolic potassium hydroxide (solution complete after 30 minutes) and kept at room temperature for six hours. The pH is adjusted to 4.5 and the reaction mixture diluted with water and the ethanol evaporated. The aqueous suspension is extracted with chloroform and the chloroform solution washed with water, dried and evaporated to give 105 mg. of crude product. Two crystallizations from acetone give 43 mg. of analytically pure 3,4-secolupane-4-ol-3-oic acid. M.P. 210–212°; $[\alpha]_D$ —1.3°;

$$\lambda_{max.}^{Nujol} 3.20, 5.82\mu$$

*Analysis.*—Calc'd for $C_{30}H_{52}O_3$: C, 78.20; H, 11.38; N.E. 460. Found: C, 78.08; H, 11.48; N.E. 457.

EXAMPLE 22

Methyl 3,4-seco-4-methylcholestane-4-one-3-oate

A solution of 10 mg. of methyl 4-methyl-4-methylene-3,4-seco-cholestane-3-oate in 2 ml. of ethyl acetate is ozonized with a large excess of ozonized oxygen at —40°. The solution is allowed to stand at —40° for 15 minutes, warmed to room temperature and treated with 0.5 g. of zinc dust and a drop of glacial acetic acid after stirring for 10 minutes. The reaction mixture is filtered, washed with water, dried over sodium sulfate and evaporated to dryness. The reaction product is chromatographed on a thin layer of neutral alumina, Activity V, and eluted with 1:1 benzene:hexane. The band corresponding to the known reaction product ($R_f=0.3$) is isolated and rechromatographed in the same manner. The product is reisolated and crystallized from methanol. Yield: 2 mg., M.P. 74–76°. Recrystallization from methanol gives a product, M.P. 75–76°, whose IR spectrum is identical and whose melting point is not depressed when mixed with an authentic sample of methyl 4-methyl-4-methylene-3,4-seco-cholestant-3-oate, M.P. 77–78°, described in Example 7.

EXAMPLE 23

Substituting the various starting materials employable in the practice of this invention for the materials employed in the examples set forth above, and following the procedures of those examples, the results set forth in the following Table A are obtained:

TABLE A

| Starting materials | Final products |
|---|---|
| (1) Lenostane-3-one | (1a) 3,4-seco-lanostane-4-ol-3-oic acid. |
| | (1b) 3,4-seco-Δ⁴⁽²⁸⁾-lanostene-3-oic acid. |
| | (1c) 3,4-seco-28-nor-lanostane-4-one-3-oic acid. |
| (2) Euphane-3β-ol-11-one (first oxidized to euphane-3,11-dione. | (2a) 3,4-seco-euphane-4-ol-3-oic acid. |
| | (2b) 3,4-seco-Δ⁴⁽²⁸⁾-euphene-3-oic acid. |
| | (2c) 3,4-seco-28-nor-euphane-4-one-3-oic acid. |
| (3) 8,9-Oxidotirucallane | (3a) 8,9-oxido-3,4-seco-tirucallane-4-ol-3-oic acid. |
| | (3b) 8,9-oxido-3,4s-eco-Δ⁴⁽²⁸⁾-tirucallene-3-oic acid. |
| | (3c) 8,9-oxido-3,4-seco-28-nortirucallane-4-one-3 oic acid. |
| (4) Cycloartenone | (4a) 3,4-seco-cycloartenane-4-ol-3-oic acid. |
| | (4b) 3,4-seco-Δ⁴⁽²⁸⁾-cycloartenene-3-oic acid. |
| | (4c) 3,4-seco-28-nor-cycloartenane-4-one-3 oic acid. |
| (5) Oleanane-3-one | (5a) 3,4-seco-oleanane-4-ol-3-oic acid. |
| | (5b) 3,4-seco-Δ⁴⁽²³⁾-oleanene-3-oic acid. |
| | (5c) 3,4-seco-23-nor-oleanane-4-one-3-oic acid. |
| (6) α-Amyrine-12,13-oxide | (6a) 12,13-oxido-3,4-seco-ursane-4-ol-3-oic acid. |
| | (6b) 12,13-oxido-3,4-seco-Δ⁴⁽²³⁾-ursane-3-oic acid. |
| | (6c) 12,13-oxido-3,4-seco-23-norursane-4-one-3-oic acid. |
| (7) Dehydrotaraxasterol | (7a) 3,4-seco-taraxastane-4-ol-3-oic acid. |
| | (7b) 3,4-seco-Δ⁴(]³)-taraxastene-3-oic acid. |
| | (7c) 3,4-seco-23-nor-taraxastane-4-one-3-oic acid. |
| (8) Dehydrotaraxerone | (8a) 3,4-seco-taraxane-4-ol-3-oic acid. |
| | (8b) 3,4-seco-Δ⁴⁽²³⁾-taraxene-3 oic acid. |
| | (8c) 3,4-seco-23-nor-taraxane-4-one-3-oic acid. |
| (9) Friedeline | (9a) 3,4-seco-friedelane-4-ol 3-oic acid. |
| (10) Alnusonyl Acetate | (10a) 3,4-seco-alnusane-4-ol-3-oic acid. |
| | (10b) 3,4-seco-Δ⁴⁽²³⁾-alnusene-3-oic acid. |
| | (10c) 3,4-seco-23-nor-alnusane-4-one-3-oic acid. |

The invention may be variously otherwise embodied within the scope of the appended claims.

What is claimed is:
1. Cholestane steroid of the formula

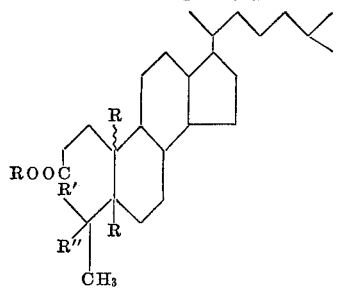

wherein each R is selected from the group consisting of hydrogen and lower alkyl; R' is hydroxy; R" is selected from the group consisting of hydrogen and lower alkyl; and together R' and R" is selected from the group consisting of lower alkylene and oxo.

2. 3,4-seco-4,4-dimethylcholestane-4-ol-3-oic acid.
3. 3,4-seco-(4R)-4-methyl-4-hydroxy - 3 - cholestanoic acid.
4. 3,4-seco-(4S)-4-methyl-4-hydroxy - 3 - cholestanoic acid.
5. 3,4-seco-4-keto-4-methyl-3-cholestanoic acid.
6. 3,4-seco-4-methyl-4-methylene-3-cholestanoic acid.
7. 3,4-secoeburicane-4-ol-11-one - 3,21 - dioic acid 21-methyl ester.
8. 3,4-secolupane-4-ol-3-oic acid.
9. 3,4-secodammarane-4,20ξ-diol-3-oic acid.
10. 3,4-seco-25,26,27-trisnordammarane - 4,20ξ - diol-3,24-dioic acid.

References Cited

Hara et al.: "Chem. and Ind." 12–15, 1962, No. 50, pp. 2086–7.

Stevenson: "J. Org. Chem.," vol. 28 (1963), pp. 188–190.

Fieser et al.: "Steroids," Reinhold Publishing Co., 1959, pp. 249–360.

LORRAINE A. WEINBERGER, *Primary Examiner.*
P. J. KILLOS, *Assistant Examiner.*

U.S. Cl. X.R.
260—514, 343.2, 343.5, 239.57, 999